(12) United States Patent
Robertsson et al.

(10) Patent No.: US 6,836,448 B2
(45) Date of Patent: Dec. 28, 2004

(54) SYSTEM AND METHOD FOR SEISMIC WAVEFIELD SEPARATION

(75) Inventors: Johan Olof Anders Robertsson, Oslo (NO); Andrew Curtis, Edinburgh (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 336 days.

(21) Appl. No.: 10/181,232
(22) PCT Filed: Jan. 19, 2001
(86) PCT No.: PCT/GB01/00186
§ 371 (c)(1),
(2), (4) Date: Jul. 9, 2002
(87) PCT Pub. No.: WO01/53854
PCT Pub. Date: Jul. 26, 2001

(65) Prior Publication Data
US 2003/0076741 A1 Apr. 24, 2003

(30) Foreign Application Priority Data

Jan. 21, 2000 (GB) .............................................. 0001355
Feb. 15, 2000 (GB) .............................................. 0003406

(51) Int. Cl.$^7$ .............................. G01V 1/28; G01V 1/36
(52) U.S. Cl. ............................ 367/59; 367/38; 367/43; 367/58; 367/21; 702/17
(58) Field of Search .............................. 367/21, 24, 38, 367/43, 44, 45, 46, 58, 59; 702/14, 17

(56) References Cited

U.S. PATENT DOCUMENTS

| | | | | |
|---|---|---|---|---|
| 4,648,039 A | * | 3/1987 | Devaney et al. ............... | 702/17 |
| 4,870,580 A | * | 9/1989 | Lang et al. .................... | 702/17 |
| 4,935,903 A | * | 6/1990 | Sanders et al. ............... | 367/24 |
| 4,979,150 A | | 12/1990 | Barr | |

FOREIGN PATENT DOCUMENTS

| | | |
|---|---|---|
| EP | 0 327 758 A2 | 8/1989 |
| GB | 2 309 082 B | 12/1999 |
| GB | 2 333 364 B | 3/2000 |
| GB | 2 337 591 B | 7/2000 |
| GB | 2 341 680 B | 6/2001 |
| GB | 2 358 469 B | 2/2002 |

OTHER PUBLICATIONS

Aki et al Elastic waves from a point dislocation source Quantitative seismology—theory and mehods, W. H. Freeman & Co, 1980, pp. 68–69.

Amundsen Wavenumber–based filtering of marine point–source data Geophysics, vol. 58, No. 9, Sep. 1993, pp. 1335–1348, XP–002166869.

Amundsen et al Decomposition of multicomponent sea-floor data into upgoing and downgoing P– and S–waves Geophysics, vol. 60, No. 2, Mar.–Apr. 1995, pp. 563–572, XP–002130603.

(List continued on next page.)

*Primary Examiner*—Ian J. Lobo
(74) *Attorney, Agent, or Firm*—William L. Wang; William B. Batzer; John J. Ryberg

(57) ABSTRACT

A system and method of creating a filter for use with locally dense seismic data is disclosed. The method includes obtaining survey geometry characteristics from a locally dense seismic survey. A filter is designed which uses spatial derivatives of the wavefield of order between (1) and the maximum order of spatial derivatives of the wavefield that can be estimated within a group. The filter can be designed so as to separate up/down going components, p/s components, or both up/down and p/s components. Partial derivatives in space and time of the wavefield can be calculated, using, for example, a taylor series expansion as an approximation. The seismic data is filtered by combining estimated near surface material properties, the seismic data, and the calculated partial derivatives.

19 Claims, 15 Drawing Sheets

OTHER PUBLICATIONS

Amundsen et al Multiple attenuation and P/S splitting of multicomponent OBC data at a heterogeneous sea floor Wave Motion, vol. 32, 2000, pp. 67–78.

Barr et al Attenuation of water–column reverberations using pressure and velocity detectors in a water–bottom cable Expanded abstracts from the 59th Ann. Internat. Mtg., Soc. Expl. Geophys., 1989, 653–656.

Dankbaar Separation of P– and S–waves Geophysical Prospecting, 33, 1985, pp. 970–986.

Holliger et al Effects of the shallow subsurface on upper crustal seismic reflection images Tectonophysics, 286, 1998, 161–169.

Osen et al Towards optimal spatial filters for de–multiple and P/S splitting of OBC data Expanded abstracts from the 68th Ann. Internat. Mtg., Soc. Expl. Geophys., 1998, 2036–2039.

Robertsson et al Viscoelastic finite–difference modeling Geophysics, vol. 59, No. 9, Sep. 1994, pp. 1444–1456, XP–002166870.

Robertsson et al Source–generated noise in shallow seismic data European J. of Env. and Eng. Geophys., vol. 1, 1996, pp. 107–124.

Robertsson et al Wavefield separation using a volume distribution of three component recordings Geophys. Res. Lett., vol. 26, No. 18, 1999, pp. 2821–2824.

Schalkwijk et al Decomposition of multicomponent ocean–bottom data in two steps Expanded abstracts from the 68th Ann. Internat. Mtg., Soc. Expl. Geophys., 1998, 1425–1428.

Spiegel Formulas from Vector analysis Mathematical handbook of formulas and tables, McGraw–Hill, 1968, p. 120.

White Plane waves Seismic waves: radiation, transmission and attenuation, McGraw–Hill, 1965, pp. 14–77.

Zhou et al Numerical seismogram computations for inhomogeneous media using a short, variable length convolutional differentiator Geophysical Prospecting, vol. 41, 1993, pp. 751–766, XP–000994570.

* cited by examiner

SYSTEM AND METHOD FOR SEISMIC WAVEFIELD SEPARATION

FIELD OF THE INVENTION

The present invention relates to the field of seismic data acquisition and processing. In particular, the invention relates to a system and method for seismic wavefield separation.

BACKGROUND OF THE INVENTION

Optimal processing, analysis and interpretation of land seismic data ideally require full information about the wavefield so that the wavefield can be separated into its up- and down-going and P- and S-components as well as determining phase and polarity. For 3C acquisition of land surface seismic data it is common practice simply to interpret the vertical component as the P-section and the horizontal components as SV- and SH-sections. This "traditional" P/S interpretation is exact for vertical arrivals. However, as energy is incident away from normal incidence angles, this approximation breaks down, both because of projections on to all components, but also because of a non-unity reflection coefficients and mode-conversions at the free-surface.

Exact analytical filter expressions for wavefield separation have previously been derived by for instance Dankbaar, J. W. M., 1985, Separation of P- and S-waves: Geophys. Prosp., 33, 970–986, and these have been applied to seismic data in conventional recording geometries. Unfortunately, statics problems severely limit the practical use of these wave-equation based techniques.

SUMMARY OF THE INVENTION

Thus, it is an object of the present invention to provide a filtering technique that lends itself to be applied within local densely deployed single sensor receiver groups where statics are substantially constant.

It is a further object of the present invention to provide a filtering technique that can be implemented efficiently directly in the spatial domain.

According to the invention a method of creating a filter for use with locally dense seismic data is provided. The method includes obtaining survey geometry characteristics from a locally dense seismic survey designed to record characteristics of an elastic or acoustic wavefield. The seismic survey is made up of a number of groups of receivers, with each group comprising at least three receivers densely spaced from each other. According to the method, a filter is designed which uses spatial derivatives of the wavefield of order between 1 and the maximum order of spatial derivatives of the wavefield that can be estimated within a group. The filter is designed such that when combined with data from within a single group, the filter separates components of some or all of the wavefield arriving at the single group.

The filter can be designed so as to separate up/down going components, p/s components, or both up/down and p/s components.

The densely spaced receivers in the group are preferably spaced apart such that statics in the portion of the wavefield of interest are substantially constant. More preferably, each of the densely spaced receivers in the group are spaced apart by about 2 meters or less, or by a distance of about one fifth the shortest wavelength of interest or less.

Partial derivatives of the wavefield are also preferably calculated, and this can be done using a taylor series expansion as an approximation. According to the invention, the seismic data is preferably filtered by combining estimated near surface material properties, the seismic data, and the calculated partial derivatives (both in space and time).

The filter can also be used to separate surface waves or airwave induced ground motion from the seismic data. The free surface condition can be used to convert vertical derivatives of the wavefield to horizontal derivatives of the wavefield.

According to the invention, the seismic survey is performed primarily for the purpose hydrocarbon reservoir exploration, evaluation or characterisation, although other uses can be made.

The invention is applicable where the near surface velocities are isotropic or anisotropic.

DETAILED DESCRIPTION OF THE INVENTION

Figure 1A:
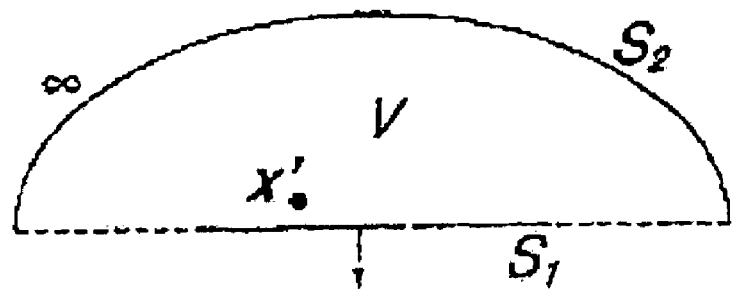
FIGS. 1a–c show various illustrations of the elastodynamic representation theorem, according to the invention.

According to the invention a new approach is provided for P/S separation of land surface seismic data and for removing the effects of the Earth's free surface (i.e. up/down separation). By converting vertical spatial derivatives to horizontal derivatives using the free-surface condition, the methodology can make use of locally dense measurements of the wavefield at the free surface to calculate all spatial derivatives of the wavefield. These can in turn be used to compute divergence (P-waves) and curl (S-waves) of the wavefield at the free surface.

The effects of the free surface are preferably removed through an up/down separation step using the elastodynamic representation theorem. This results in expressions where spatial filters are convolved with recorded data. The filters can be successfully approximated so that they fit the local dense acquisition pattern used for the P/S separation step. In particular, the simplest approximate expression for up-going P-waves consists of two terms. The first term preferably corresponds to the divergence in the presence of the free surface scaled by a material constant. The second term preferably is a time derivative of the recorded vertical component scaled by a material constant. Hence, a correction is added to the "traditional" P-interpretation through the first term, which improves accuracy for incidence angles outside normal incidence.

In UK Patent Application entitled "System and Method for Estimating Seismic Material Properties" (UK Patent Application No. 0003410.8) filed on 15 Feb. 2000, incorporated herein by reference, a method is provided than can use the volumetric recordings of the wavefield to invert for P and S velocities in the Earth in the neighbourhood of a small, closely-spaced array of receivers. "Volumetric recording" refers to an array that approximately encloses a volume of the Earth. The quantities estimated are the effective velocities of the P- and S-components of the wavefield at any point in time. Hence, these will vary with both wave type and wavelength. If estimated for the near surface Earth structure, such velocities may be useful for statics estimation, or for separation of the wavefield into up- and down-going components as described herein.

Implications of the free surface condition for land seismic recording will be discussed first with reference to the fully anisotropic case. The elastic constitutive relation relates components of the stress tensor $\sigma_{ij}$ in a source free region to the strain tensor components $\epsilon_{ij}$ $$\sigma_{ij} = c_{ijkl} \epsilon_{kl}, \tag{1}$$

where $c_{ijkl}$ are the elastic stiffnesses. Index values 1 and 2 correspond to horizontal coordinates $x_1$ and $x_2$ whereas index value 3 corresponds to the vertical direction downwards $x_3$. Using the Voigt notation, equation (1) can be written as:

$$\begin{pmatrix} \sigma_{11} \\ \sigma_{22} \\ \sigma_{33} \\ \sigma_{23} \\ \sigma_{13} \\ \sigma_{12} \end{pmatrix} = C \begin{pmatrix} \varepsilon_{11} \\ \varepsilon_{22} \\ \varepsilon_{33} \\ 2\varepsilon_{23} \\ 2\varepsilon_{13} \\ 2\varepsilon_{12} \end{pmatrix}, \tag{2}$$

where C is the symmetric stiffness matrix with 21 independent components:

$$C = \begin{pmatrix} c_{11} & c_{12} & c_{13} & c_{14} & c_{15} & c_{16} \\ c_{21} & c_{22} & c_{23} & c_{24} & c_{25} & c_{26} \\ c_{31} & c_{32} & c_{33} & c_{34} & c_{35} & c_{36} \\ c_{41} & c_{42} & c_{43} & c_{44} & c_{45} & c_{46} \\ c_{51} & c_{52} & c_{53} & c_{54} & c_{55} & c_{56} \\ c_{61} & c_{62} & c_{63} & c_{64} & c_{65} & c_{66} \end{pmatrix}. \tag{3}$$

The strain $\epsilon_{ij}$ is related to particle velocity $v_i$ through $$\dot{\varepsilon}_{ij} = \frac{1}{2}(\partial_j v_i + \partial_i v_j), \tag{4}$$

where $\partial i$ denotes spatial derivatives in the $x_1$, $x_2$ or $x_3$ directions, and the dot denotes a time derivative. In land acquisition, spatial distributions of 3C receivers at the surface allow us to compute horizontal spatial derivatives of particle velocities (or time-derivatives thereof if particle acceleration is recorded, etc.). The only information missing in order to know the wavefield completely is the vertical derivatives of the recorded wavefield.

The free-surface condition at the Earth's surface gives us three additional constraints:

$$\sigma_{i3} = 0, \tag{5}$$

which are sufficient to allow us to compute the remaining velocities given that we make some independent estimate of the relevant elastic stiffnesses.

In addition, constraints on the relation between individual elements of the stress and strain tensors could possibly be used to correct for coupling or to compute near-surface properties.

The case of isotropic material properties in the near-surface environment is of particular interest in the land surface seismic case. Using the Voigt notation, the stiffness matrix takes the following form:

$$C = \begin{pmatrix} \lambda+2\mu & \lambda & \lambda & 0 & 0 & 0 \\ \lambda & \lambda+2\mu & \lambda & 0 & 0 & 0 \\ \lambda & \lambda & \lambda+2\mu & 0 & 0 & 0 \\ 0 & 0 & 0 & \mu & 0 & 0 \\ 0 & 0 & 0 & 0 & \mu & 0 \\ 0 & 0 & 0 & 0 & 0 & \mu \end{pmatrix}, \tag{6}$$

where $\lambda$ and $\mu$ are the Lamé constants.

The constraints imposed by the free-surface condition (5) become:

$$\partial_3 v_3 = -\frac{\lambda}{\lambda+2\mu}(\partial_1 v_1 + \partial_2 v_2) \tag{7}$$

$$\partial_3 v_2 = -\partial_2 v_3 \tag{8}$$

$$\partial_3 v_1 = -\partial_1 v_3, \tag{9}$$

where the horizontal derivatives on the right hand side are known from the surface measurements. Note that the material properties only occur in equation (7) and not in equations (8) and (9).

Divergence and curl of a wavefield at a free surface overlaying a homogeneous isotropic half space will now be discussed. This discussion is in the context of an isotropic media. The elastic wave equation for particle displacement u can be written as:

$$\rho \ddot{u} = f + (\lambda+2\mu)\nabla(\nabla \cdot u) - \mu\nabla \times (\nabla \times u), \tag{10}$$

where $\rho$ is the density and f denotes a distribution of body forces. Lamé's theorem states that there exist potentials $\Phi$ and $\Psi$ of u with the following properties:

$$u = \nabla\Phi + \nabla \times \Psi, \tag{11}$$

$$\nabla \cdot \Psi = \hat{U}, \tag{12}$$

$$\ddot{\Phi} = \frac{\phi}{\rho} + c_\alpha^2 \nabla^2 \Phi, \tag{13}$$

$$\ddot{\Psi} = \frac{\psi}{\rho} + c_\beta^2 \nabla^2 \Psi, \tag{14}$$

where $c_\alpha$ and $c_\beta$ are the P- and S-velocities, and $\phi$ and $\psi$ are potential components associated with the body force. An elastic wavefield u can thus be decomposed into its P- and S-wave components, $\nabla\Phi$ and $\nabla \times \Psi$, respectively. Equations (11) and (12) yield:

$$\nabla \cdot u = \nabla^2 \Phi, \tag{15}$$

$$\nabla \times u = \nabla \times \nabla \times \Psi \tag{16}$$

By measuring the curl and the divergence of an elastic wavefield we can thus measure the P- and S-wave components separately.

An acquisition pattern comprising tetrahedra of 3C measurments can be used to achieve the separation of the wavefield into its curl- and divergence-free components. See, e.g. Robertsson, J. O. A., and Muyzert, E., 1999, Wavefield separation using a volume distribution of three component recordings: Geophys. Res. Lett., vol. 26, 2821–2824, incorporated herein by reference. Such acquisition patterns are described in further detail in UK Patent Application No. 9921816.6, incorporated herein by reference. All spatial derivatives of the wavefield components can be calculated. Therefore, divergence and curl can be calculated explicitly from surface measurements only. Equations (7), (8) and (9) give us the following expressions for divergence and curl of particle velocity at a free surface:

$$(\nabla \cdot v) = \frac{2\mu}{\lambda + 2\mu}(\partial_1 x_1 + \partial_2 x_2), \quad (17)$$

$$(\nabla \times v)_1 = 2\partial_2 v_3, \quad (18)$$

$$(\nabla \times v)_2 = -2\partial_1 v_3, \quad (19)$$

$$(\nabla \times v)_3 = \partial_1 v_2 - \partial_2 v_1. \quad (20)$$

First we note that the ratio $$\frac{2\mu}{\lambda + 2\mu} = 2(c_\beta/c_\alpha)^2$$

(may be frequency dependent) scales the expression for the divergence in equation (17).

Second, equations (17), (18), (19) and (20) contain both the up-going and down-going parts of the wavefield. This includes mode conversions at the free surface. For instance, the divergence given by (17) contains not only the desired up-going P-waves, but also, the down-going P-to-P reflection, down-going S-to-P conversions, etc. Moreover, a plane P-wave which is vertically incident on the free-surface will have zero divergence (up- and down-going parts interfere destructively). Removing the effects of the free surface is therefore regarded as an important step in the preferred P/S separation technique.

A technique for Up/down wavefield separation using the elastodynamic representation theorem will now be discussed. The elastodynamic representation theorem or Betti's relation can be derived from the equation of motion and the elastic constitutive relations using Gauss' theorem. Suppose that we have a volume V enclosed by a surface S, and that we wish to calculate the displacement of a wavefield u at a point x' in V. The displacement u(x') is directly related to the stress σ and displacement along S, sources in V, as well as the displacement Green's tensor $G_{ij}$ and the stress Green's tensor $\Sigma_{ijk}$ functions between S or source points and x':

$$u_n(x') = \oint_S \left( t_i(x) G_{in}(x, x') - u_i(x) \hat{n}_j \sum_{jin} (x, x') \right) dS(x) + \int_V \frac{1}{i\omega} G_{in} f_i dV, \quad (21)$$

where n̂ is the normal unit vector to S, $t_i(x)$ is the traction across S at point x and $f_i$ is the $i^{th}$ component of the force from sources within V. Equation (21) shows the frequency domain expression of the representation theorem. In the time domain we would also have convolutions in time. The traction t along S is defined as $$t = \hat{n} \cdot \sigma. \quad (22)$$

Figure 1B:
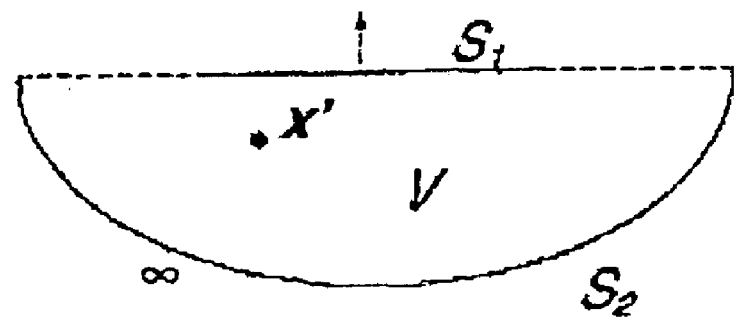
Figure 1C:
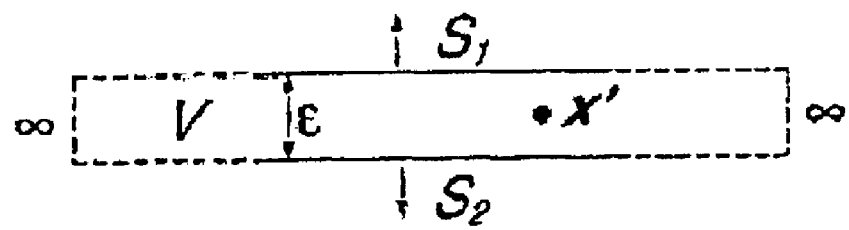

Now, suppose that the volume V consists of a homogeneous elastic medium. FIGS. 1a–c show various illustrations of the elastodynamic representation theorem, according to the invention. First, consider the closed surface $S_1 + S_2$ illustrated in FIG. 1a. In this case we assume that we have a source located outside V so that it is recorded along $S_1$ as an up-going mode. Sommerfeldt's radiation condition implies that the contribution from $S_2$ vanishes at infinity. Hence, the closed surface integral in equation (21) can be replaced by the open surface integral:

$$v_n(x') = \int_{S_1} \left( t_i(x) G_{in}(x, x') - v_i(x) \hat{n}_j \sum_{jin} (x, x') \right) dS(x). \quad (23)$$

The expression in equation (23) represents an up-going wavefield at x' since the field is up-going at $S_1$.

Next consider the situation depicted in FIG. 1b. If we in a similar way put the source above $S_1$ outside V, we obtain an analogous expression to equation (23) for the down-going wavefield.

Finally, we consider the situation shown in FIG. 1c. This time we assume that $S_1$ follows the Earth's surface topography, that no sources (primary or secondary) are located in V, and that x' is located infinitesimally below the land surface. Again, the left and right edges of the surface S are at infinity and do not contribute to the integral. The representation theorem therefore becomes:

$$v_n(x') = \int_{S_1 + S_2} \left( (-i\omega) t_i(x) G_{in}(x, x') - v_i(x) \hat{n}_j \sum_{jin} (x, x') \right) dS(x). \quad (24)$$

In equation (24) we have used particle velocities $v_i$ instead of displacements $u_i$ since this will be more convenient to work with. From the above derivation it is now clear that the integral contribution over $S_1$ corresponds to the down-going field at x'. Moreover, for a horizontal free surface we know that $\sigma_{i3} = 0$ (equation (5)). Since the total field consists of a sum of up-going and down-going waves, the up-going particle velocity field just below the surface is therefore given by $$\tilde{v}_n(x') = v_n(x') + \int_{S_i} v_i(x) \sum_{3in} (x, x') dS(x). \quad (25)$$

Hereinafter the tilde denotes a wavefield with up-going waves only, i.e. having removed the effects of the free surface from the wavefield.

According to a preferred embodiment of the invention, the elastodynamic representation theorem can be used to extract the desired up-going wavefield from surface seismic recordings. For a discussion in the case of seismic data from ocean bottom cables, see Published UK Patent Application GB 2 333 364 A, incorporated herein by reference.

In the following discussion, ω is the angular frequency, $k_\alpha = \omega/c_\alpha$ and $k_\beta = \omega/c_\beta$ are the P- and S-wavenumbers, $c_\alpha$ and $c_\beta$ are the (isotropic) P- and S-velocities, and ρ is the density.

The elastic displacement Green's tensor in an isotropic homogeneous medium is:

$$G_{in}(x, x', \omega) = \qquad (26)$$

$$\frac{1}{\rho\omega^2}(k_\beta^2 \delta_{in} g_\beta(x, x', \omega) + \partial_i \partial_r (g_\beta(x, x', \omega) - g_\alpha(x, x', \omega))),$$

Where $g_\alpha$ and $g_\beta$ are the P- and S-Green's functions, and $\delta_{in}$ is Kronecker's delta. For homogeneous media in 3-D these are given by:

$$g(x, x', \omega) = \frac{1}{4\pi} \frac{e^{ik|x-x'|}}{|x-x'|}. \qquad (27)$$

The corresponding isotropic stress Green's tensor is given in terms of the displacement Green's tensor as:

$$\Sigma_{ijk} = \lambda \delta_{ij} \partial_k G_{kn} + \mu(\partial_j G_{in} + \partial_i G_{jn}). \qquad (28)$$

A flat horizontal free surface is assumed here. Expressions are therefore needed for Green's functions such that $x=(\xi, x_3)$ and $x'=(\xi', x'_3)$ are located very close to each other in the $x_3$-direction, whereas the horizontal separation can be arbitrary. Hence, $x_3 - x'_3 =_\in 430^+$ and the Green's tensors are shift invariant with respect to the $x_1$ and $x_2$ directions.

Since the "free-space" Green's tensors $G_{kl}$ and $\Sigma_{ijk}$ in equations (26) and (28) are shift invariant, the expressions for the up-going wavefield given by the representation theorem (25) can be written as spatial convolutions denoted by $*$:

$$\tilde{v}_1(x) = \frac{1}{2}(v_1(x) - F_{v_3}^{v_1}(x) * v_3(x)), \qquad (29)$$

$$\tilde{v}_2(x) = \frac{1}{2}(v_2(x) - F_{v_3}^{v_2}(x) * v_3(x)), \qquad (30)$$

$$\tilde{v}_3(x) = \frac{1}{2}(v_3(x) - F_{v_1}^{v_3}(x) * v_1(x) + F_{v_2}^{v_3}(x) * v_2(x)). \qquad (31)$$

The filters in equations (29), (30), and (31) are:

$$F_{v_3}^{v_\nu} = 2\Sigma_{33\nu}(x_3 = x_3') = -2\partial_\gamma((1 + 2k_\beta^{-2}\partial_\zeta \partial_\zeta)g_\alpha + 2k_\beta^{-2}\partial_3^2 g_\beta), \qquad (32)$$

$$F_{v_\nu}^{v_3} = 2\Sigma_{3\nu 3}(x_3 = x_3') = 2k_\beta^{-2}\partial_\nu(-2\partial_3^2 g_\alpha + (k_\beta^2 + 2\partial_3^2)g_\beta), \qquad (33)$$

where the subscripts $\nu$ and $\zeta$ denote either index 1 or 2 corresponding to horizontal coordinates $x_1$ and $x_2$.

Using the Green's function in equation (27), we can obtain explicit expressions for the filters in equations (32) and (33) that can be implemented directly. In the fk-domain these are:

$$F_{v_3}^{v_\nu} = \frac{k_\nu}{k_3^{(\alpha)}} (1 - 2k_\beta^{-2}(k_\zeta k_\zeta + k_3^{(\alpha)} k_3^{(\beta)})), \qquad (34)$$

$$F_{v_\nu}^{v_3} = \frac{k_\nu}{k_3^{(\beta)}} (1 - 2k_\beta^{-2}(k_\zeta k_\zeta + k_3^{(\alpha)} k_3^{(\beta)})), \qquad (35)$$

where $k_3^{(\alpha)} = \sqrt{k_\alpha^2 - k_\zeta k_\zeta}$ is the vertical wavenumber for P-waves and $k_3^{(\beta)} = \sqrt{k_\beta^2 - k_\zeta k_\zeta}$ is the vertical wavenumber for S-waves.

A preferred technique for P/S separation of surface seismic data will now be discussed. We can calculate the divergence and curl of the up-going waves by taking spatial derivatives of equations (29), (30) and (31). Some care must be taken here since this involves spatial derivatives of the stress Green's tensor $\Sigma_{ijk}$. In this fashion, the following expressions are obtained:

$$(\nabla \cdot \tilde{v}) = \frac{k_\beta^2}{k_\alpha^2}(\partial_1 v_1 + \partial_2 v_2) + F_{v_3}^{(\nabla \cdot v)}(x) * v_3(x), \qquad (36)$$

$$(\nabla \times \hat{v})_1 = \partial_2 v_3 + F_{v_1}^{(\nabla \times v)1}(x) * v_1(x) + F_{v_2}^{(\nabla \times v)1}(x) * v_2(x), \qquad (37)$$

$$(\nabla \times \hat{v})_2 = -\partial_1 v_3 + F_{v_1}^{(\nabla \times v)2}(x) * v_1(x) + F_{v_2}^{(\nabla \times v)2}(x) * v_2(x), \qquad (38)$$

$$(\nabla \times \tilde{v})_3 = \frac{1}{2}(\partial_1 v_2 - \partial_2 v_1). \qquad (39)$$

Again, using the Green's function in equation (27), we can obtain explicit expressions for the filters in equations (36), (37) and (38). In the fk-domain these are:

$$F_{v_3}^{(\nabla \cdot v)} = -ik_\alpha^2 \frac{(1 - 2k_\beta^{-2} k_\zeta k_\zeta)}{2k_3^{(\alpha)}}, \qquad (40)$$

$$F_{v_1}^{(\nabla \times v)1} = i\frac{k_1 k_2}{2k_3^{(\beta)}}, \qquad (41)$$

$$F_{v_2}^{(\nabla \times v)1} = i\frac{k_\beta^2 - k_\zeta k_\zeta - k_2^2}{2k_3^{(\beta)}}, \qquad (42)$$

$$F_{v_1}^{(\nabla \times v)2} = -i\frac{k_\beta^2 - k_\zeta k_\zeta - k_1^2}{2k_3^{(\beta)}}, \qquad (43)$$

$$F_{v_2}^{(\nabla \times v)2} = -F_{v_1}^{(\nabla \times v)1}. \qquad (44)$$

The traditional way for P-wave interpretation is to simply look at the recorded $v_3$ component. This is exact for vertically propagating P-waves. As we saw above, the divergence on the other hand is zero at the free surface. For horizontally propagating P-waves, the situation is reversed; $v_3$ is zero whereas the divergence exactly contains the P-waves. From equations (36) and (40) we see that the correct expression combines $v_3$ with the expression for divergence in the presence of the free surface so that it holds true for all incidence angles.

Equations (40) to (44) are all functions of the material properties $c_\alpha$ and $c_\beta$ at the receiver location. Estimation of these parameters using a full wave equation approach with dense surface measurements consistent with that taken here are described in UK Patent Application entitled "System and Method for Estimating Seismic Material Properties" (UK Patent Application No. 0003410.8) filed on 15 Feb. 2000.

An example of a preferred implementation of wavefield separation filters will now be discussed. The filters derived above can in theory be implemented directly which yield expressions that are exact for homogeneous media with a flat surface. These expressions would remove all down-going and evanescent wave types including ground-roll.

However, the filters are slowly decaying and contain some complicating factors. High-order factors of $k_1$ and $k_2$ correspond to high-order derivatives in the spatial domain. The most severe problems arise from the factors $k_3^{(\alpha)}$ and $k_3^{(\beta)}$. These terms do not correspond to any straightforward implementation in the spatial domain. When they occur in the denominator they introduce a pole in $k_\alpha$ and $k_\beta$ respectively.

One straightforward filter approximation is to make Taylor expansions around $k_\zeta = 0$ in the wavenumber domain (factors of $k_\zeta$ correspond to spatial derivatives). The lowest order terms in the Taylor approximations to equations (40), (41), (42), (43) and (44) are:

$$F_{v_3}^{(\nabla \cdot v)} \approx i\frac{k_a}{2} - i\frac{k_a}{4}k_\zeta k_\zeta(4k_\beta^{-2} - k_a^{-2}), \quad (45)$$

$$F_{v_1}^{(\nabla \times v)_1} \approx i\frac{k_1 k_2}{2k_\beta}, \quad (46)$$

$$F_{v_2}^{(\nabla \times v)_1} \approx -\frac{ik_\beta}{2} + \frac{i}{4k_\beta}(2k_2^2 + k_\zeta k_\zeta), \quad (47)$$

$$F_{v_1}^{(\nabla \times v)_2} \approx \frac{ik_\beta}{2} - \frac{i}{4k_\beta}(2k_1^2 + k_\zeta k_\zeta), \quad (48)$$

$$F_{v_2}^{(\nabla \times v)_2} \approx -i\frac{k_1 k_2}{2k_\beta}. \quad (49)$$

Figure 2:
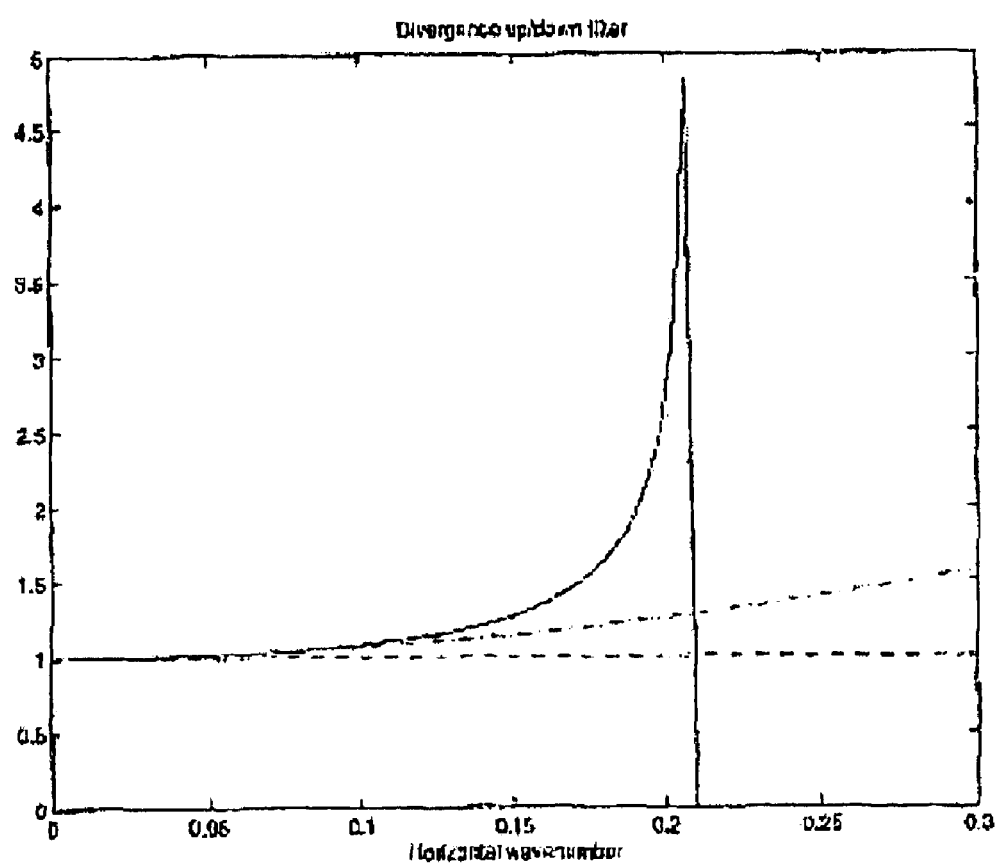
FIG. 2 shows a plot of the normalised real part of the filter for removing free surface effects from divergence in equation (36)

FIG. 2, shows a plot of the normalised real part of the filter for removing free surface effects from divergence in equation (40). The solid line shows the exact filter (equation (40)). For wavenumbers beyond the pole corresponding to horizontally propagating P-waves, the filter is imaginary (evanescent modes). FIG. 2 also shows a plot of the zeroth-order (dashed line), and the first-order (dash-dotted line) Taylor approximations as given by equation (45).

The application of a preferred wavefield separation approach to synthetic data will now be discussed. A reflectivity code was used to test the wavefield separation approach according to a preferred embodiment of the invention. See e.g., Kennett, B. L., 1983, Seismic wave propagation in stratified media: Cambridge University Press, Cambridge. This was chosen as opposed to for instance finite differences since up- and down-going wavefields can be calculated separately. Moreover, the quantities right below an interface can be obtained accurately. The output from the reflectivity code are particle velocities and divergence of particle displacement.

Figure 3A:
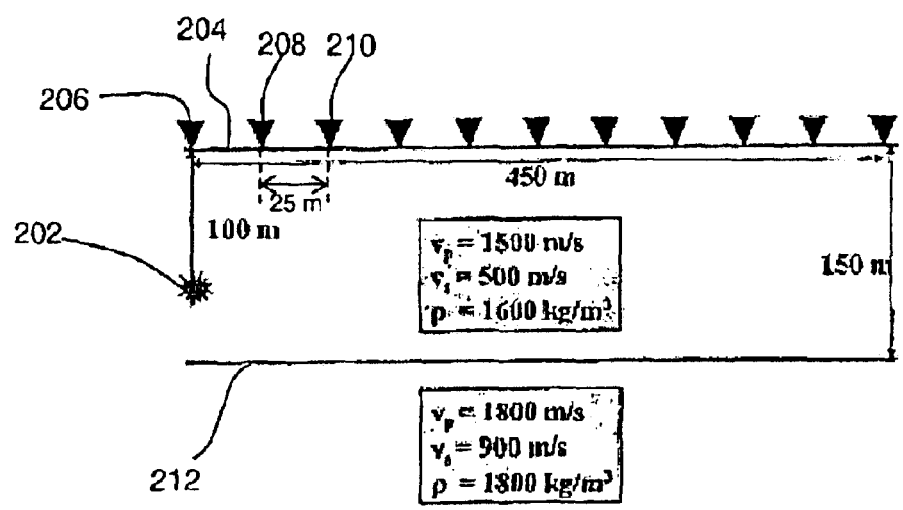
FIGS. 3a and 3b show an example of a seismic survey having locally dense receiver groups, according to the invention.
Figure 3B:
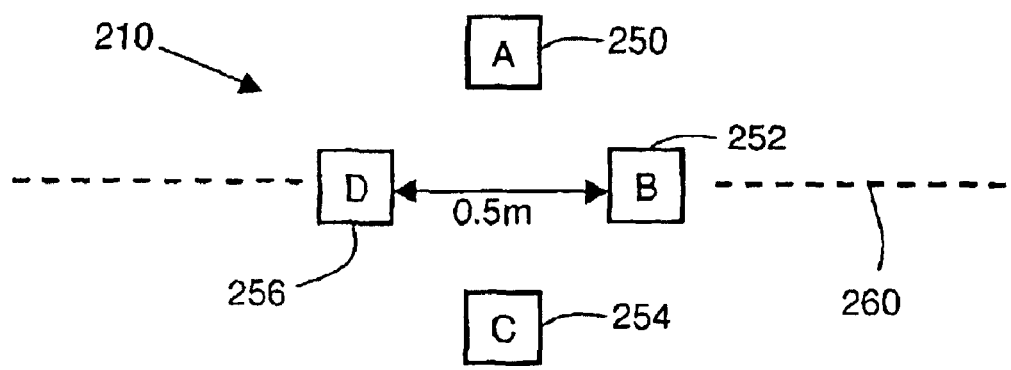

FIGS. 3a and 3b show an example of a seismic survey having locally dense receiver groups, according to the invention. FIG. 3a is also the model used to test the wavefield separation approach according to a preferred embodiment of the invention. In the model, a point-source was used to generate 3-D synthetics. The source consisted of a 50 Hz Ricker wavelet and was of explosive type (radiating P-waves only).

As shown in FIG. 3a source 202 is located 100 m below earth surface 204. The wavefield was recorded at 25 m inter-group spacing from 0 m offset to 450 m. Geophone groups 206, 208 and 210 are shown as the first three groups in a series of groups, each spaced apart by 25 meters. At each recording location, each receiver group comprises four 3C geophones were spaced evenly at 0.5 m in both horizontal directions. Also shown in FIG. 3a is a reflective subterranean surface 212 that is located 150 meters below earth surface 204.

FIG. 3b is a plan view showing an example of geophone layout within a single receiver group 210. Receiver group 210 comprises four geophones 250, 252, 254, and 256 located on the ground surface. Receivers 250 and 254 are spaced apart about 0.5 meters from each other, and receivers 252 and 256 are spaced apart about 0.5 meters from each other. Also shown in FIG. 3b is a dashed line 260 on which the other receiver groups are positioned, for example, receiver groups 206 and 208.

Advantages of moving to smaller inter-receiver spacings include increased accuracy in the estimated derivatives, and greater validity in the assumption that the material properties are the same in the vicinity of the receivers. However, an advantage of wider spacing is less sensitivity to noise. These competing concerns in combination with the wavelength of elastic or acoustic waves (or more accurately, the projection of the wavefield on the recording surface), should be taken into consideration when designing the receiver group spacing. According to a presently preferred embodiment, the locally dense receivers are spaced about 1 meter apart. However spacing can in some situations be larger, for e.g. around 2 meters, or smaller, e.g. 0.5 meters. According to a preferred embodiment the inter-receiver spacing is around 0.25 meters or less. As mentioned, the optimal spacing of the receivers depends upon the wavelength of interest. There should be at least two receivers within the projection of the shortest wavelength of interest on the recording surface. According to a preferred embodiment the receivers are spaced apart by a distance approximately equal to or less than one-fifth of the shortest wavelength of interest.

In the model based on the geometry shown in FIGS. 3a and 3b, the measurements from the receiver groups were used to obtain horizontal derivatives of the wavefield at each location. In this example, we will test our wavefield separation techniques on divergence. We expect that curl should display similar results. Finally, all sections shown in this example have been plotted using the same scale for amplitudes so that amplitudes can be compared directly to each other both between traces and different sections.

Figure 4A:
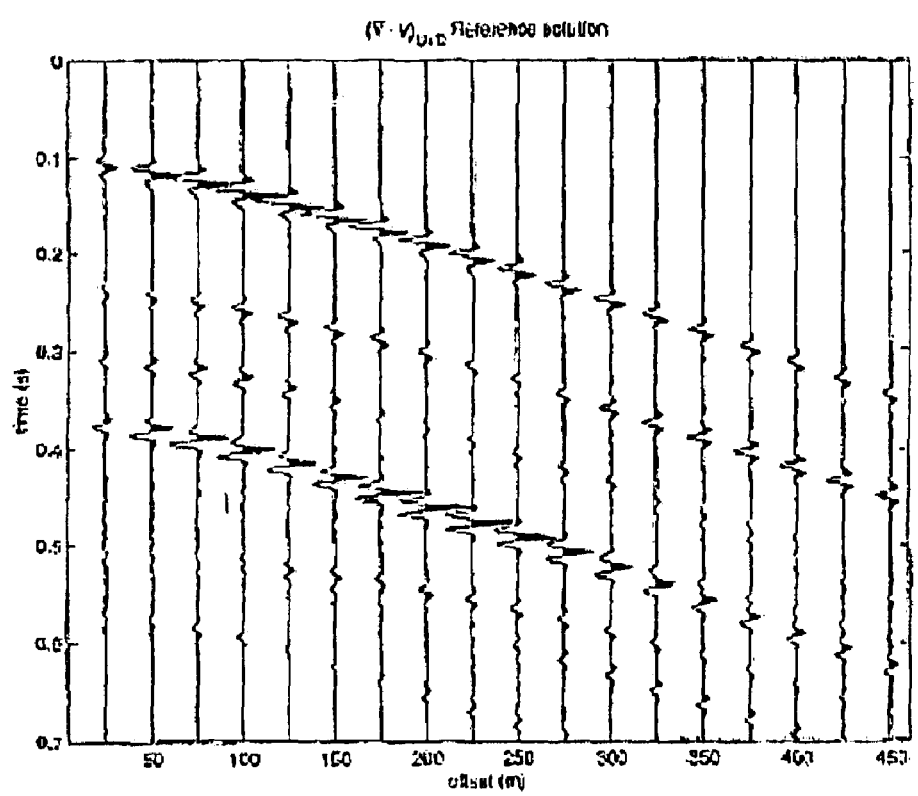
FIGS. 4a and 4b show the divergence as calculated directly by numerical methods.
Figure 4B:
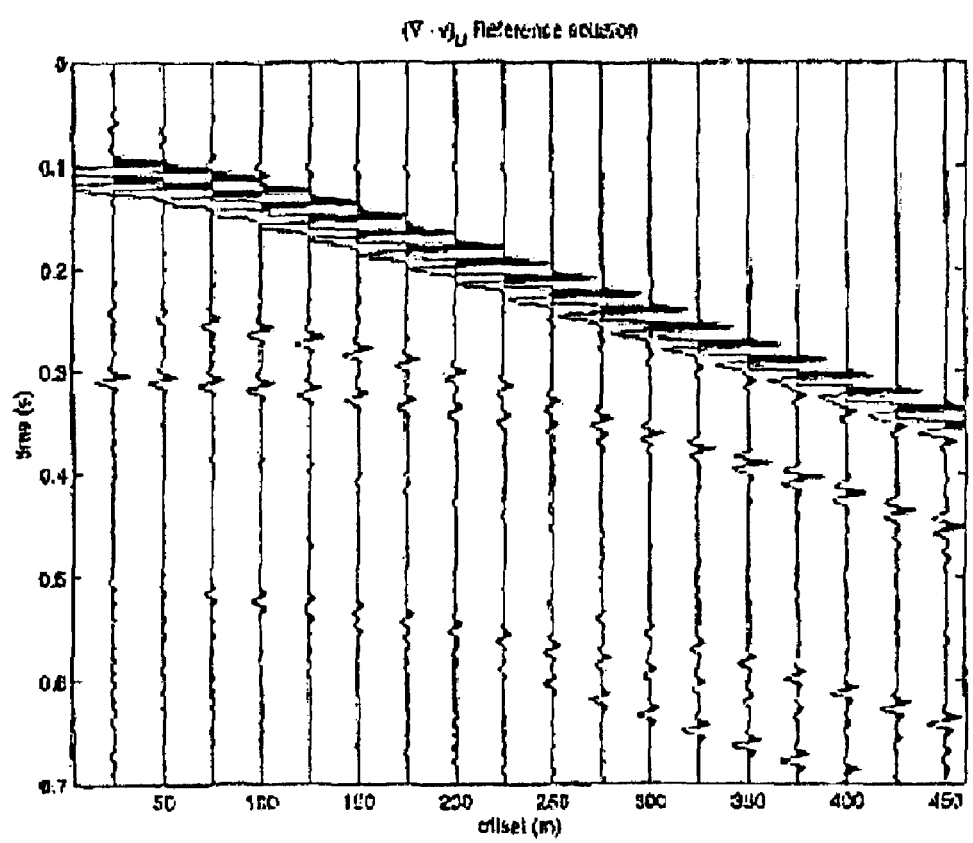

FIGS. 4a and 4b show the divergence as calculated directly by the reflectivity code. FIG. 4a shows a section containing both up and down going waves. Note that as we approach zero offset the divergence vanishes. This is because the divergence is zero for vertically propagating plane P-waves. FIG. 4b shows the divergence of the up-going waves only. This is the desired P-wave section that we wish to obtain using our approach for wavefield separation and will therefore serve as our reference solution. Notice that the amplitude variation of different events in the section are quite different compared to those in the section in FIG. 4a. Also notice the absence of some events due to mode conversions from S- to P-waves at the free surface. Some numerical artifacts in the numerical solution are also visible (e.g., the flat event before the first arrivals).

Figure 5A:
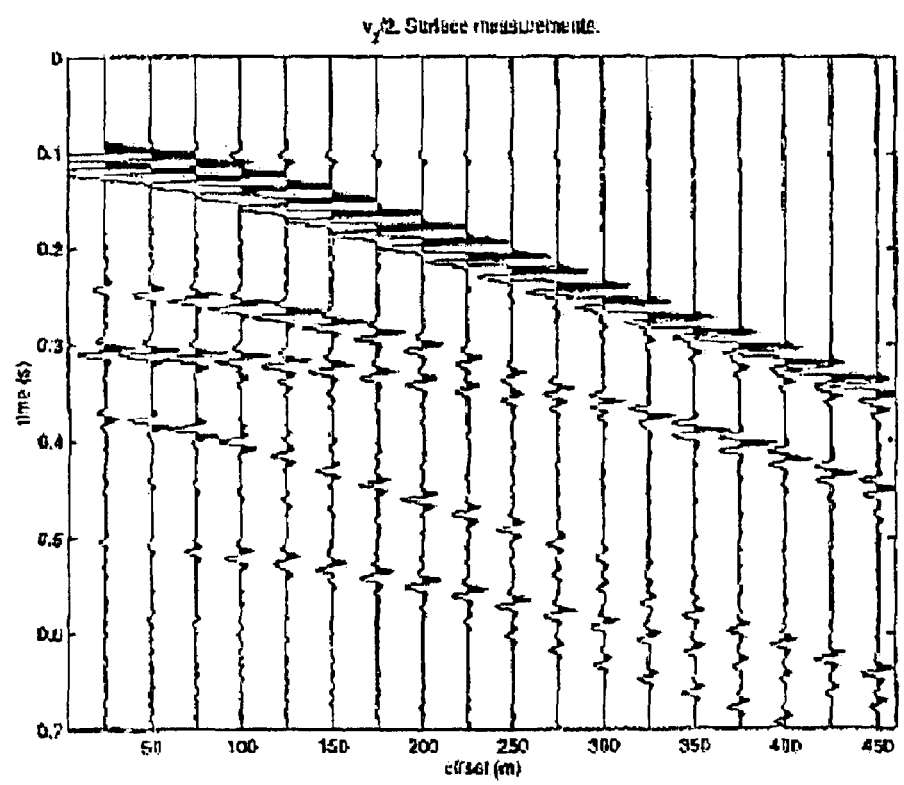
FIGS. 5a–d illustrate sections obtained from $v_3$ measurements only.
Figure 5B:
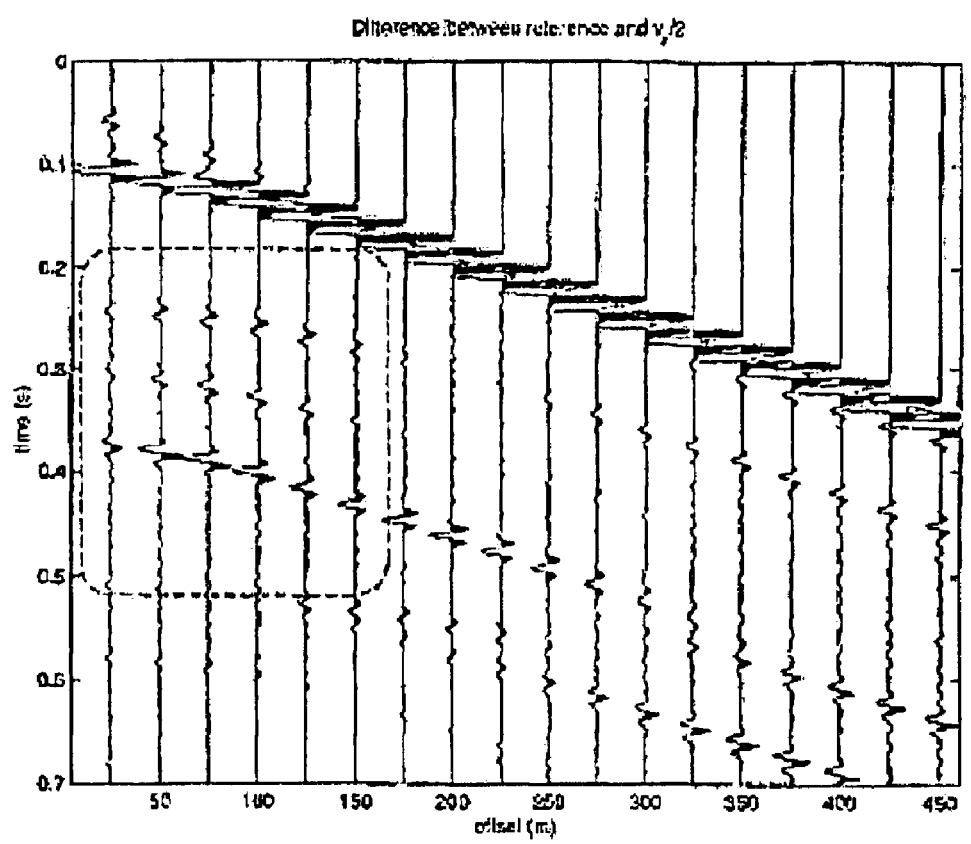

Traditionally, 3C data have been interpreted by assuming that waves propagate vertically near the receivers (steep gradients in material properties are assumed in the near-surface region). Hence, P-waves show up on the vertical $v_3$ component whereas S-waves appear on the horizontal $v_1$ and $v_2$ components. FIGS. 5a–d illustrate sections obtained from $v_3$ measurements only. To be able to compare them with divergence we have applied a time derivative to the $v_3$ measurements and scaled them with the P-velocity. FIG. 5a shows $v_3$ divided by a factor of two, according to a conventional technique. This exactly corresponds to the up-going P-waves for normal incidence (equation (36)). FIG. 5b shows the difference between this section and the reference solution. We see that the correspondence to P-waves rapidly breaks down away from normal incidence, where S-waves and mode conversions significantly contaminate the result.

Figure 5C:
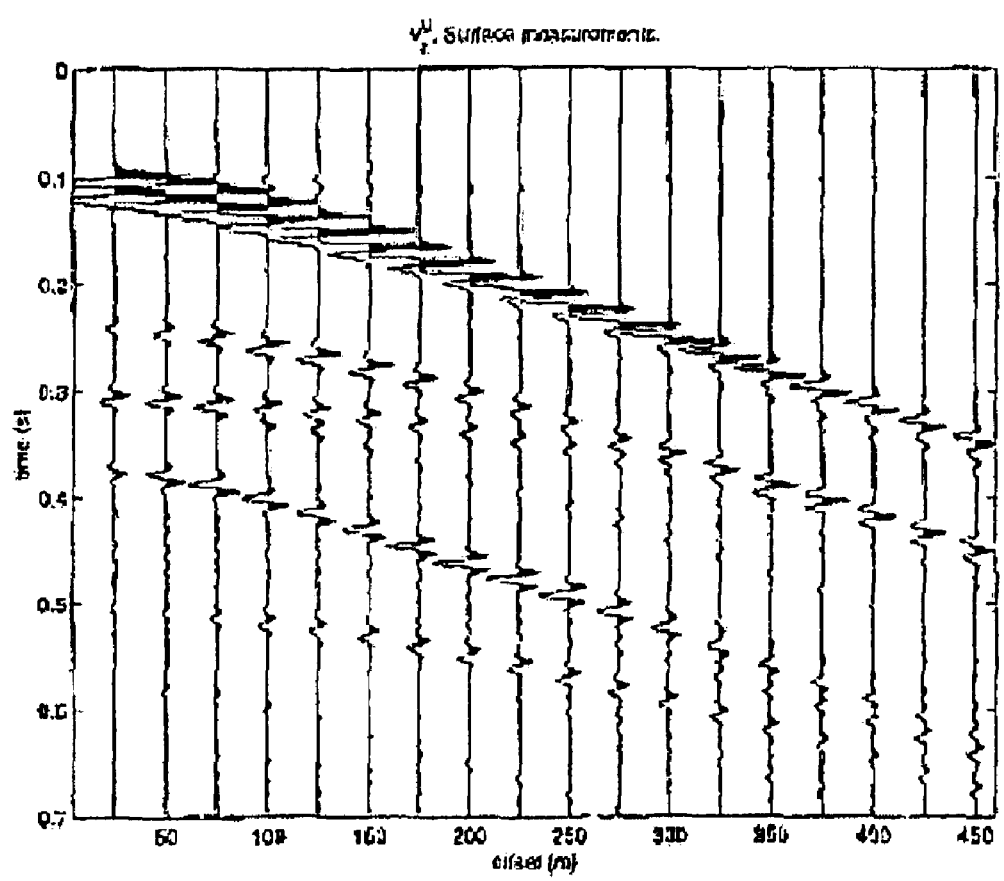
Figure 5D:
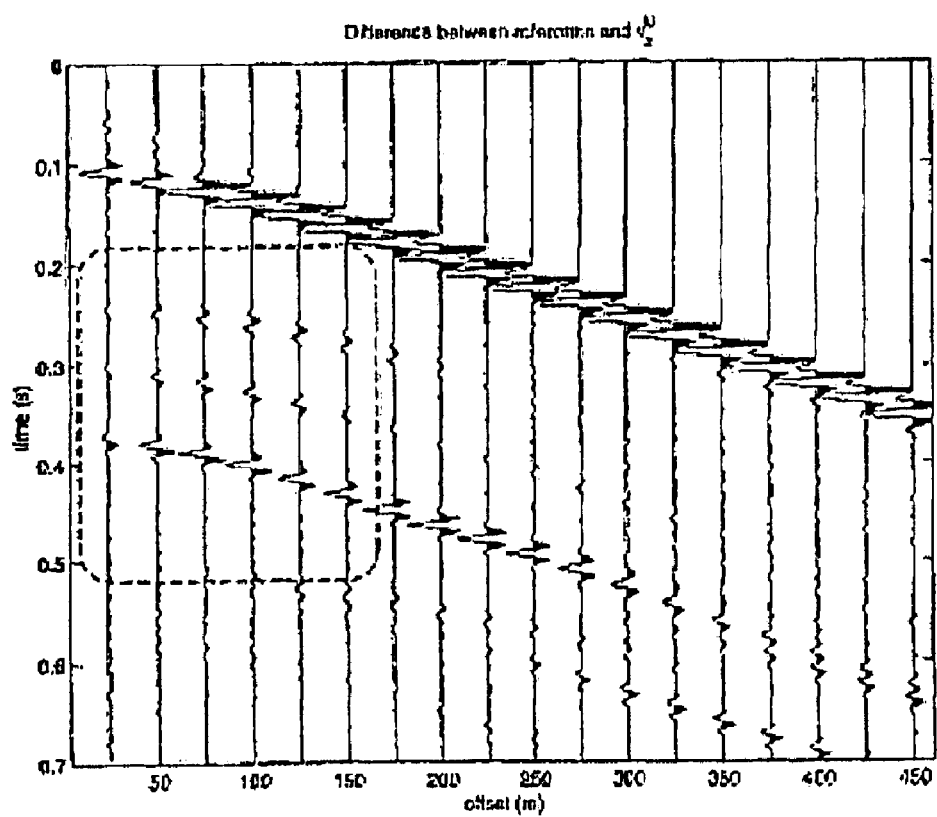

Part of the problem is of course that the $v_3$ measurements contain both up- and down going waves. According to the invention, these can be removed using a preferred wavefield separation technique as described herein. As can be seen from equations (31) and (35), this requires knowledge about P- and S-velocities in the near surface as well as convolving spatial filters with the measured $v_1$ and $v_2$ components and adding them to the $v_3$ measurements. FIG. 5c shows such a section. FIG. 5d shows the difference between this solution and the reference solution. Even though the result has improved somewhat compared to just taking the raw $v_3$ measurements, the result can be improved even further.

Figure 6A:
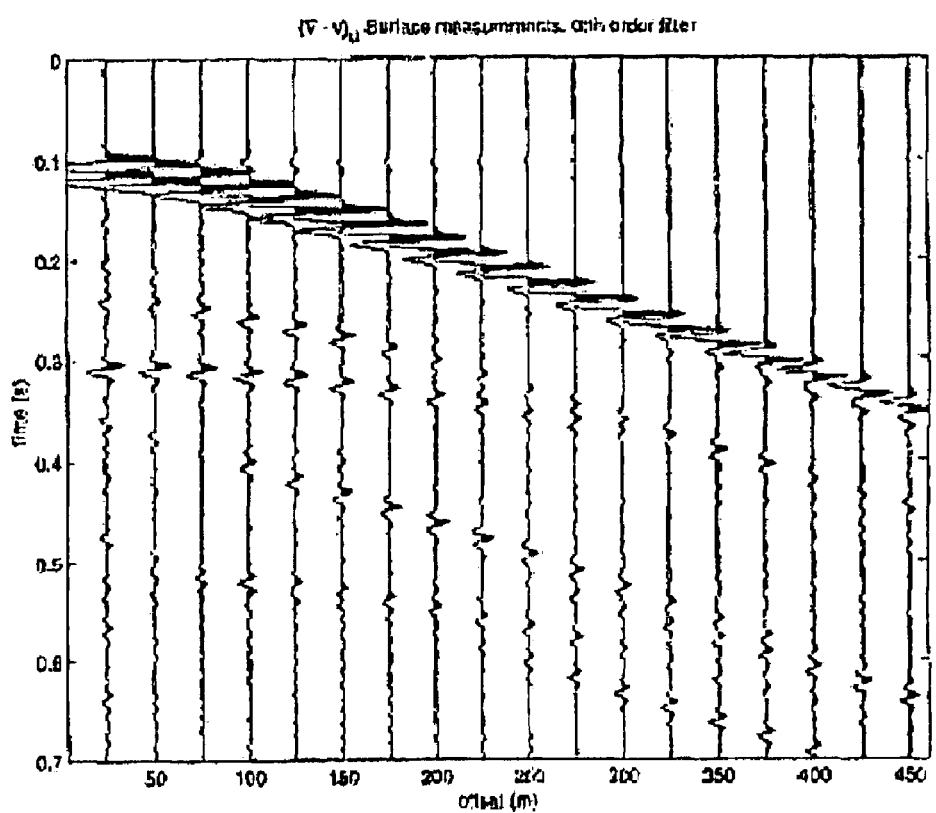
FIGS. 6a–d show the results of using a wavefield separation technique according to a preferred embodiment of the invention.
Figure 6B:
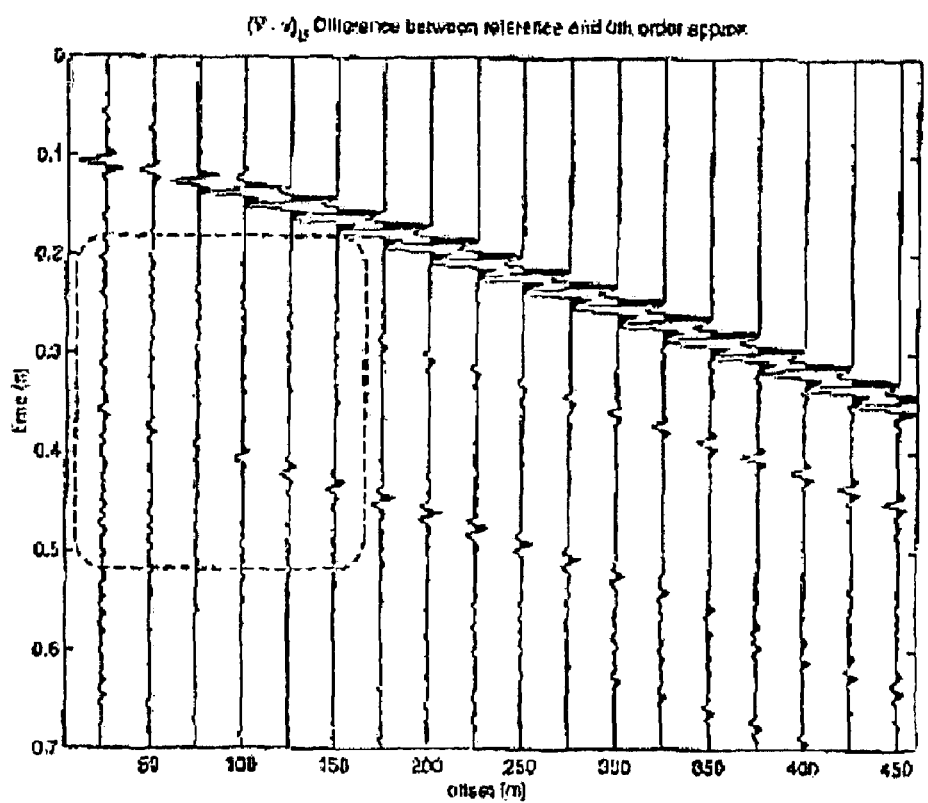

FIGS. 6a–d show the results of using a wavefield separation technique according to a preferred embodiment of the invention. In FIG. 6a we have used the zeroth-order Taylor approximation (first term in equation (45)). This combines first-order spatial derivatives of $v_1$ and $V_2$ with a time derivative of $v_3$. FIG. 6b shows the difference between this solution and the reference solution. Although, the numerical noise that is present in the numerical solution has been amplified somewhat by the spatial derivatives, the result is now much closer to the reference solution.

Figure 6C:
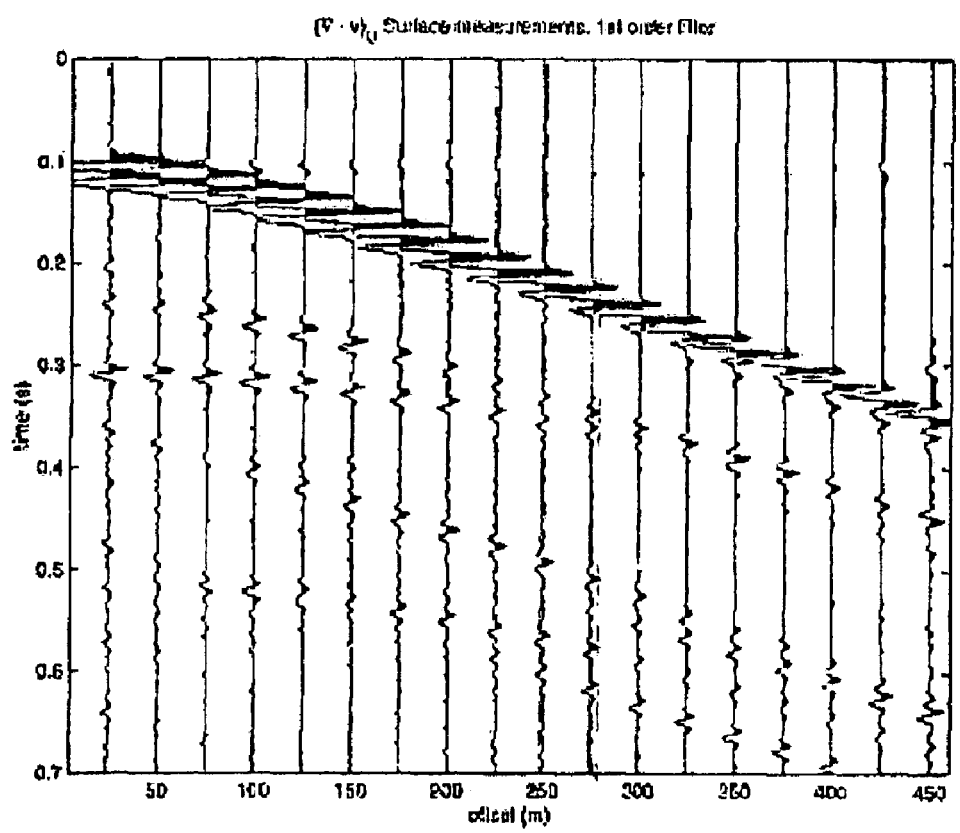
Figure 6D:
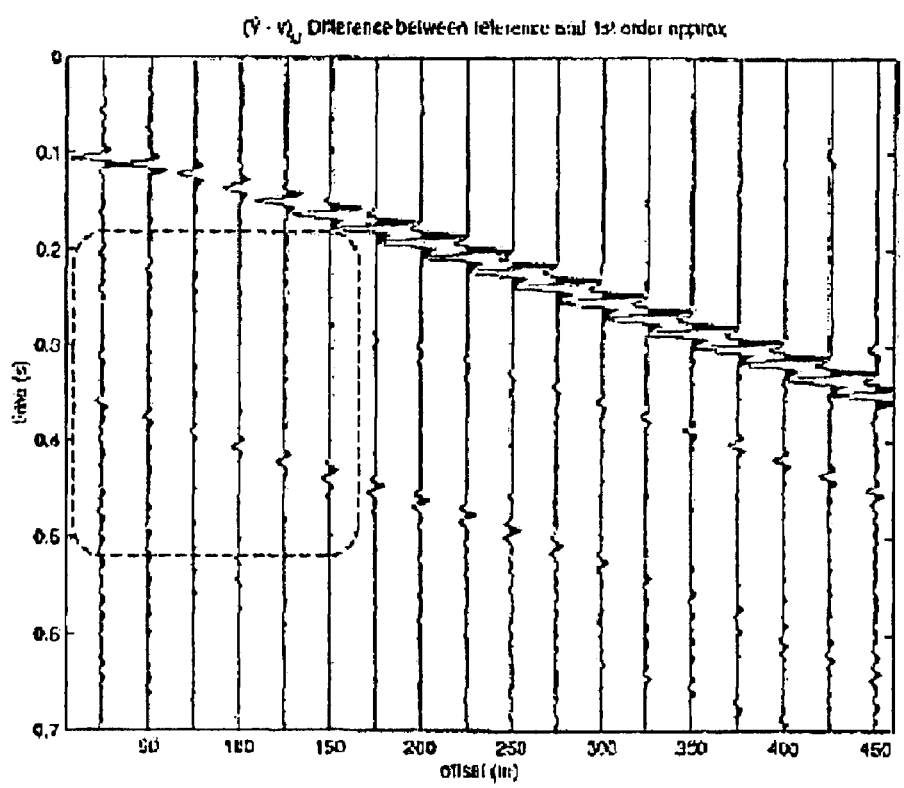

In FIG. 6c we have used the first-order Taylor approximation (both terms in equation (45)). This combines first-order spatial derivatives of $v_1$ and $v_2$ with a time derivative and second-order spatial derivatives of $v_3$. FIG. 6d shows the difference between this solution and the reference solution. Again, the solution has improved even further without increasing the noise level compared to the zeroth-order approximation.

By comparing all the difference sections in FIGS. 5 and 6, it is clear that wavefield separation using the techniques according to the invention yield much better results than the traditional P-wave interpretation techniques. This is particularly the case for the window between 0.2 and 0.5 s and 0 m to 150 m offset in the sections which contain events with very realistic incidence angles at moderate to low angles with respect to normal incidence (velocity gradients in the near surface causes energy to be incident fairly close to normal incidence). In this example, we estimate that the approximate filters improve the results particularly for incidence angles up to 30° from normal incidence (this result is strongly dependent on material properties). However, it should be noted that only the theoretical expression for the divergence up/down separation filter in equation (40) is exact for all wave types Therefore, longer filter approximations will tend to deal better with horizontally propagating and evanescent wave modes.

According to the invention a new approach for P/S separation of land surface seismic data and removing the effects of the free surface is provided. By converting vertical derivatives to horizontal derivatives through the use of the free surface condition, the methodology can be used even when measurements are taken only at the free surface. Therefore by making locally dense measurements of the wavefield, all spatial derivatives needed to compute divergence and curl of the wavefield at the free surface can be obtained. These in turn correspond to P- and S-waves in isotropic media.

The effects of the free surface can be removed through an up/down separation step as described herein. The filter for P-waves depends on both P- and S-velocity at the receivers, whereas the S-wave filters only depend on the S-velocity. Approximations to the filters were derived using Taylor approximations and tested on synthetic data.

Filters have been derived for up/down and P/S separation using plane wave expansions in Dankbaar, J. W. M., 1985, Separation of P- and S-waves: Geophys. Prosp., 33, 970–986. These expressions can be compared to our expressions for full filters. A principal difference between the work by Dankbaar and those described herein, is that by deploying dense configurations of 3C geophones, P/S and up/down separation in 3D for each recording station can be done separately. The preferred up/down separation step makes use of approximations to spatial filters to obtain operators that are consistent with the number of geophones in the recording station. This approach is more robust since statics and near surface properties should be consistent within each recording station.

The present invention can also be implemented in several steps where for instance the P/S separation is performed in 3D. The up/down separation can be performed in 3D or in 2D using an implicit filter if data are acquired along a 2D line for instance.

For 3C acquisition of land surface seismic data it is common practice simply to interpret the vertical component as the P-section and the horizontal components as SV- and SH-sections. This "traditional" P/S interpretation is exact for vertical arrivals. However, as energy is incident at non-normal incidence angles, this approximation tends to break down, both because the different waves appear on all components, but also because reflection coefficients differ from unity and mode-conversions occur at the free-surface. By comparing the "traditional" P-sections to the new methodology using synthetic data, we find a significant improvement in obtaining accurate amplitude and phases of arrivals for non-normal incidence angles. By simply using a zeroth-order Taylor approximation, we obtained sufficiently accurate results up to incidence angles of up to around 30° away from normal incidence (this result depends on material properties in the example). Note that a zeroth-order Taylor approximation only involves first-order derivatives in time and space (along the free surface). Note that the approximate expression for divergence consists of two terms. The first term corresponds to the divergence in the presence of the free surface scaled by a material constant. The second term is a time derivative of $v_3$ scaled by a material constant. Hence, a correction is added to the "traditional" P-interpretation through the first term which improves the accuracy for incidence angles outside normal incidence.

Figure 7:
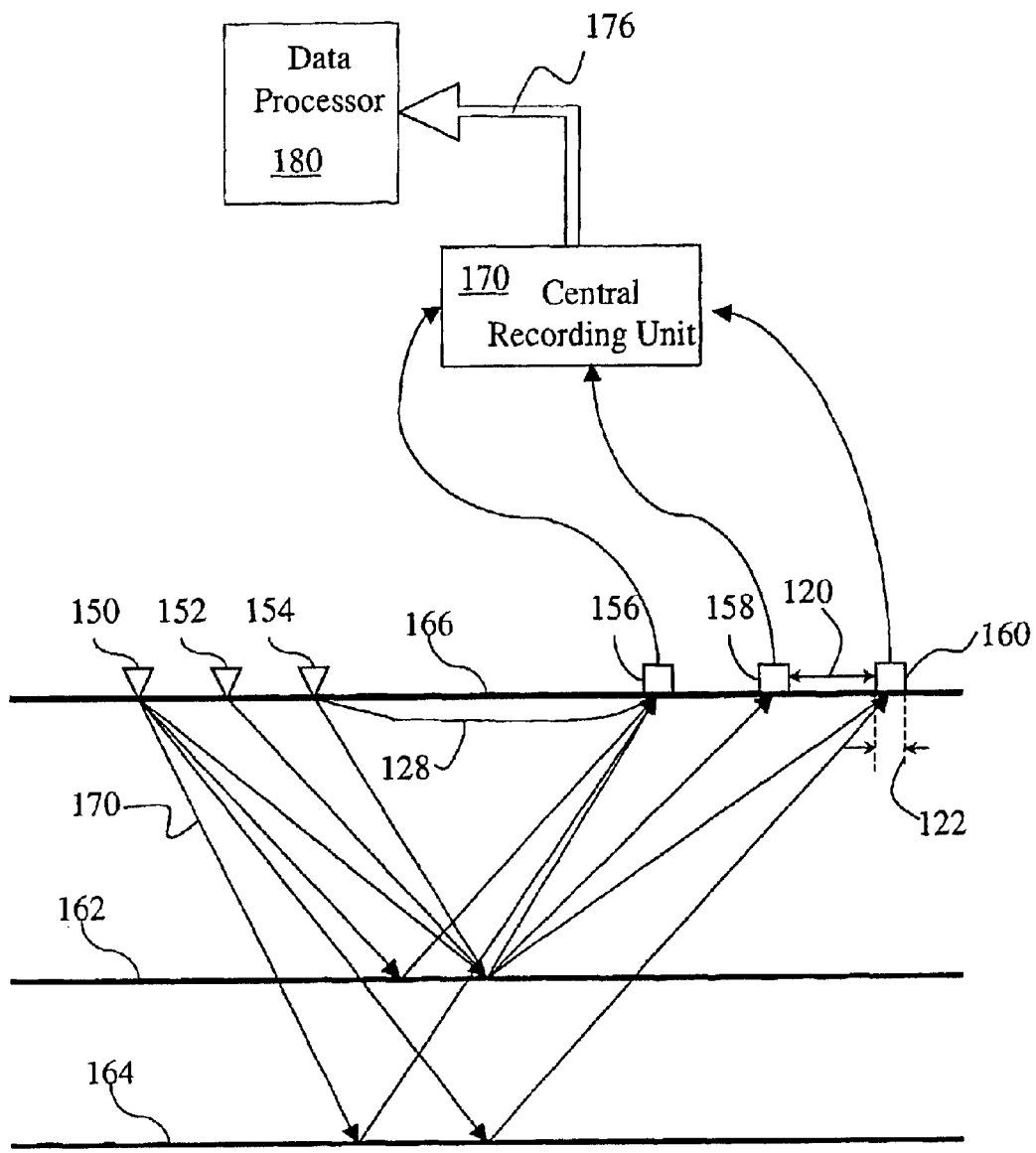
FIG. 7 is a schematic illustration of a seismic data acquisition and processing system, according a preferred embodiment of the invention.

FIG. 7 is a schematic illustration of a seismic data acquisition and processing system, according a preferred embodiment of the invention. Seismic sources 150, 152, and 154 are depicted which impart vibrations into the earth at its surface 166. The vibrations imparted onto the surface 166 travel through the earth; this is schematically depicted in FIG. 7 as arrows 170. The vibrations reflect off of certain subterranean surfaces, here depicted as surface 162 and surface 164, and eventually reach and are detected by receiver groups 156, 158, and 160. Additionally, vibrations in the form of ground roll, shown as arrow 128, travel close the surface and can be recorded by the receiver groups. Each receiver group comprises a number of receivers such as in the arrangements depicted in FIG. 3b.

Importantly, according to the preferred embodiment, the spacing of between the receivers within a single receiver group is substantially less than the spacing between the receiver groups. Schematically, this is shown in FIG. 7 by the size 122 of receiver group 160 is substantially smaller than the distance 120 between group 160 and an adjacent group 158. In the example shown in FIGS. 3a and 3b, the distance 120 is 25 meters and the size 122 of the receiver groups is 0.5 meters.

Referring again to FIG. 7, each of the receivers in groups 156, 158, and 160 convert the vibrations into electrical signals and transmit these signals to a central recording unit 170, usually located at the local field site. Preferably, the data is not group formed, but data from each geophone component are recorded. The central recording unit typically has data processing capability such that it can perform a cross-correlation with the source signal thereby producing a signal having the recorded vibrations compressed into relatively narrow wavelets or pulses. In addition, central recording units may provide other processing which may be desirable for a particular application. Once the central processing unit 170 performs the correlation and other desired processing, it typically stores the data in the form of time-domain traces on a magnetic tape. The data, in the form of magnetic tape is later sent for processing and analysis to a seismic data processing center, typically located in some other geographical location. The data transfer from the central recording unit 170 in FIG. 7 is depicted as arrow 176 to a data processor 180. Data processor 180 can be used to perform processing as described in steps 346 through 352 as shown in FIG. 8.

Figure 8:
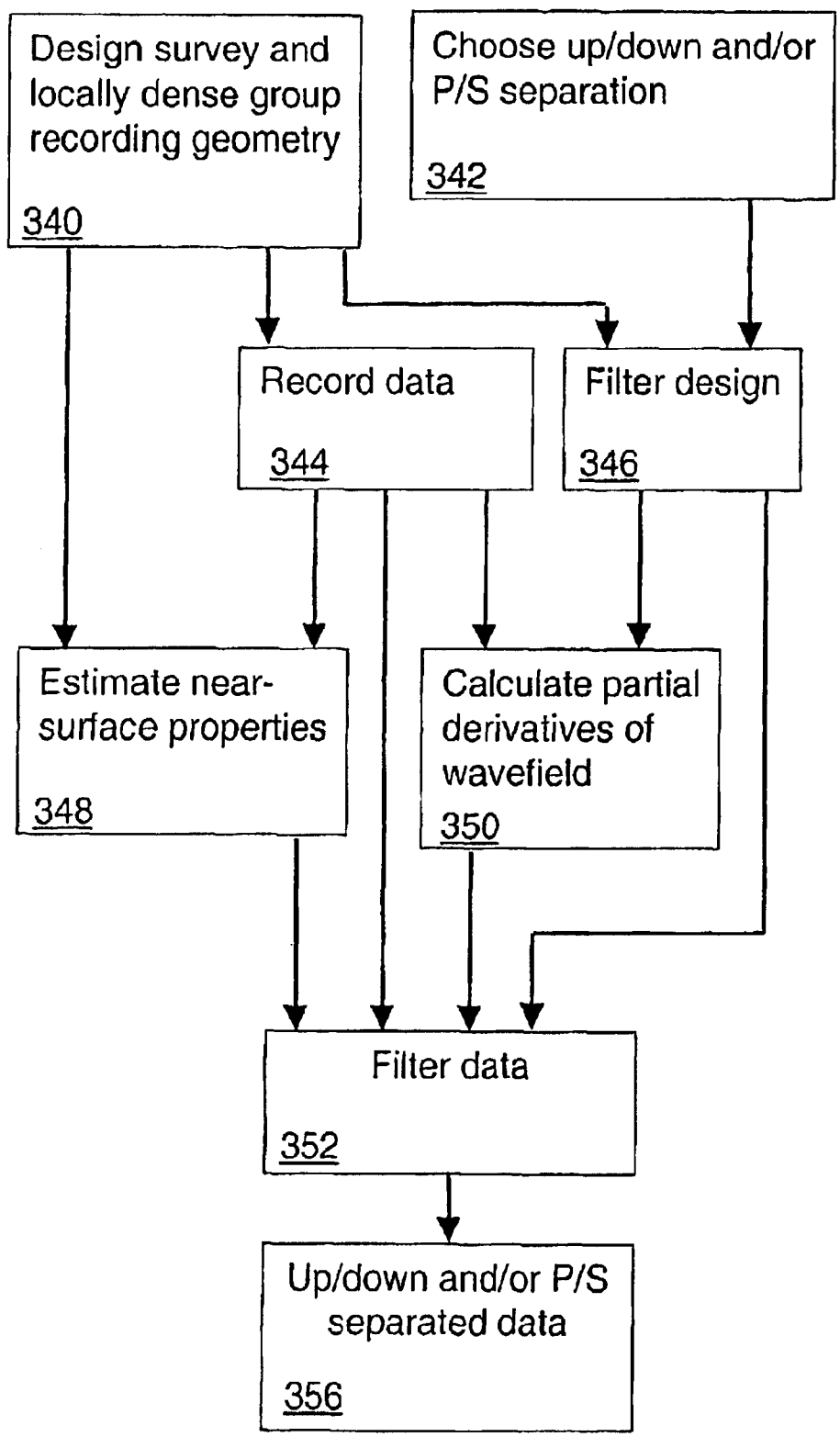
FIG. 8 shows steps involved in the filtering technique, according to preferred embodiments of the invention.

FIG. 8 shows steps involved in the filtering technique, according to preferred embodiments of the invention. In step 340 the seismic survey is designed. According to the present invention, the survey is preferably designed such that the receivers, for example geophones or hyrdophones, are positioned in locally dense arrangements as shown and described above with respect to FIGS. 3a, 3b, and 7.

In step 342 a choice is made as to which type of wavefield separation is to be carried out. As described herein, analytical expression can be used for up/down separation, p/s separation or both. In the case of up/down separation, as described above, one would preferably use equations (29), (30), (31), (34) and (35). In the case of p/s separation, as described above, one would preferably use equations (17) through (20). In situations where both up/down and p/s separation is desired, one would preferably use equations (36) through (44).

In step 346, an appropriate filter is designed based on the desired type of wavefield separation (and, accordingly, the equations selected), and based on group recording geometry as designed in step 340. In creating an appropriate filter one should preferably choose a suitable approximation to fit the recording geometry. For example, a Taylor series approximation is described above, in equations (45)–(49).

In step 344, the seismic data is measured transmitted, recorded and stored for each individual receiver in the survey.

In step 350, a calculation is made of all partial derivatives in time and space needed for the filter approximations in step 346.

In step 348, near surface material properties are estimated. This can be performed according to a number of methods. The presently preferred method is using techniques described in UK Patent Application entitled "System and Method for Estimating Seismic Material Properties" (UK Patent Application No. 0003410.8) filed on 15 Feb. 2000. However, one could also interpret near surface properties from the surface geology, or alternatively, a shallow refraction survey, or other suitable means could be used to estimate the near surface material properties.

In step 352 the seismic data is filtered as determined in step 346. This is done by combining the estimated near surface material properties estimated in step 348, the seismic data recorded in step 344, and the partial derivatives of the wavefield calculated in step 350. The result is data 356 which is separated as desired (i.e. up/down, p/s or both).

While preferred embodiments of the invention have been described, the descriptions are merely illustrative and are not intended to limit the present invention. For example, while the preferred embodiments of the invention have been described primarily for use on the land surface, the invention is also applicable to receivers placed on and below the ocean floor. In the case of ocean bottom receivers, it is preferable to use stress conditions relevant for fluid-solid boundaries rather than the free surface condition. Additionally, the present invention is applicable to seismic measurements made in a borehole, known as borehole seismics. Although the examples described assume an essentially isotropic medium in the near surface region, the invention is also applicable to anisotropic media. In the case of anisotropic media, one may wish to increase the number geophones per group.

What is claimed is:

1. A method of creating a filter for use with locally dense seismic data comprising the steps of:

obtaining survey geometry characteristics from a locally dense seismic survey designed to record characteristics of an elastic or acoustic wavefield, the survey comprising a plurality of groups of receivers, and each group comprising at least three receivers densely spaced from each other;

designing a filter which uses spatial derivatives of the wavefield of order between or including one and the maximum order of spatial derivatives of the wavefield that can be estimated within a group, such that the filter when combining data from within a single group, separates components of some or all of the wavefield arriving at the single group.

2. A method according to claim 1 wherein the filter is designed to separate up/down going components of some or all of the wavefield.

3. A method according to claim 1 wherein the filter is designed to separate p/s components of some or all of the wavefield.

4. A method according to claim 1 wherein the filter is designed to separate p/s and up/down components of some or all of the wavefield.

5. A method according to claim 1 wherein each of the densely spaced receivers in the group are spaced apart such that statics in the portion of the wavefield of interest are substantially constant.

6. A method according to claim 1 wherein each of the densely spaced receivers in the group are spaced apart by about 2 meters or less.

7. A method according to claim 1 wherein each of the densely spaced receivers in the group are spaced apart by a distance of about one fifth the shortest wavelength of interest or less.

8. A method according to claim 1 wherein the locally dense seismic survey comprises generating elastic or acoustic waves, and the receivers in a group span less than about the smallest wavelength of said elastic or acoustic waves.

9. A method according to claim 1 further comprising the step of calculating partial derivatives of the wavefield.

10. A method according to claim 9 wherein the step of calculating partial derivatives includes using a taylor series expansion as an approximation.

11. A method according to claim 9 further comprising the step of estimating near-surface material properties.

12. A method according to claim 11 further comprising the step of filtering the seismic data by combining the estimated near surface material properties, the seismic data, and the calculated partial derivatives.

13. A method according to claim 1 wherein a portion of the wave field that is separated is the pressure wavefield.

14. A method according to claim 13 wherein the filter separates surface waves and/or air wave induced ground motion from the seismic data.

15. A method according to claim 1 wherein the locally dense seismic survey is performed on land.

16. A method according to claim 15 wherein the step of creating the filter comprises using the free surface condition to convert vertical derivatives of the wavefield to horizontal derivatives of the wavefield.

17. A method according to claim 1 wherein the seismic survey is performed primarily for hydrocarbon reservoir exploration, evaluation or characterisation.

18. A method according to claim 1 wherein the near surface velocity is essentially isotropic.

19. A method according to claim 1 wherein the near surface velocity is anisotropic.

* * * * *